United States Patent [19]

Miyajima et al.

[11] 3,912,520

[45] Oct. 14, 1975

[54] WRITING INK FOR WRITING BOARDS

[75] Inventors: Tamotsu Miyajima, Oiso; Shigekazu Enami, Hiratsuka; Takamaru Murai, Kariya; Katsuhiko Kobayashi, Chigasaki, all of Japan

[73] Assignee: The Pilot Pen Company, Ltd., Tokyo, Japan

[22] Filed: Aug. 1, 1973

[21] Appl. No.: 384,512

Related U.S. Application Data

[63] Continuation-in-part of Ser. No. 173,287, Aug. 19, 1971, abandoned, which is a continuation of Ser. No. 786,744, Dec. 24, 1968, abandoned.

[30] Foreign Application Priority Data

Dec. 29, 1967 Japan.............................. 43-84258

[52] U.S. Cl..................................... 106/22; 106/32
[51] Int. Cl............................................ C09d 11/16
[58] Field of Search .................. 106/20, 22, 19, 30

[56] References Cited
UNITED STATES PATENTS

| | | | |
|---|---|---|---|
| 2,229,091 | 1/1941 | Kline................................. | 106/20 X |
| 3,632,364 | 1/1972 | Thomas et al. .................... | 106/21 X |

FOREIGN PATENTS OR APPLICATIONS

| | | | |
|---|---|---|---|
| 786,777 | 11/1957 | United Kingdom.................. | 106/20 |

*Primary Examiner*—Lewis T. Jacobs
*Attorney, Agent, or Firm*—Davis, Hoxie, Faithful & Hopgood

[57] ABSTRACT

An ink for writing on impermeable writing surfaces that can be erased by light wiping with a dry erasing material, the ink consisting essentially of a dye, a highly hygroscopic salt and at least one solvent for the dye and the salt, the solvent including at least 70 percent by weight of at least one volatile alcohol, with or without the addition of a resin thickening agent.

10 Claims, No Drawings

WRITING INK FOR WRITING BOARDS

This application is a continuation-in-part of application Ser. No. 173,287, filed Aug. 19, 1971 and now abandoned. Application Ser. No. 173,287 was a continuation of application Ser. No. 786,744, filed Dec. 24, 1968 and now abandoned.

BACKGROUND OF THE INVENTION

This invention relates to fast drying writing inks for writing boards and more particularly to an improved writing ink which can be applied to the smooth surface of an impermeable writing board and easily erased by light rubbing or wiping with a dry erasing material.

The blackboard, long used as a writing surface, is a plate whose surface is blackened with lampblack, India ink, or Japanese lacquer. Writing is accomplished using chalk, fine particles of which rub off onto and adhere to the writing surface to form an inscription. A chalk inscription, however, is not of clear color and outline, and although chalk may be erased by wiping with a dry material, erasure causes fine particles of the chalk to scatter. These soil clothing and fingers, and are unhealthy when inhaled.

Writing systems have recently appeared which overcome these disadvantages of the blackboard while still permitting erasure by light rubbing with a dry cloth or the like. These typically include an impermeable writing board with a white or lightly colored metallic, plastic, or ceramic writing surface. Writing is done in ink with a marker having a felt or fiber tip. The inks used in connection with such systems contain a solid, insoluble pigment dispersed in an organic solvent or in an aqueous solution in which a surface-active agent is mixed as a dispersant. Because insoluble pigments are used in such inks, however, their color is not clear. In addition, because the pigment and solvent separate, the color of the ink deteriorates as the writing instrument ages and, during writing, the pigment adheres to the fibers of the marker tip, causing the color of the writing ink to become faint.

If the amount of the surface-active agent in the writing ink is increased the dispersibility of the pigment can be improved, and the pigment is no longer caught in the fibrous marker, but then the applied ink remains excessively damp on the surface of the board. Because the writing remains quite damp, attempts to erase it cause smearing and soiling.

Inks containing dyes have been developed to overcome the disadvantages of inks containing pigment in such systems. These inks are clear, and their color does not deteriorate over time. Moreover, the dye does not clog the synthetic fibers of the marker tip. However, because the adherence of such writing inks on the writing surface is great, they cannot be erased easily by light rubbing with a dry erasing material and require rubbing with an erasing material wetted with water. When water is used, the writing board must be thoroughly dried before more ink is applied or else the newly applied ink will spread. Moreover, the wet erasing material absorbs the erased ink and soon becomes unusable.

Some conventional writing inks may be erased by rubbing with a dry erasing material if the relative humidity of the atmosphere is above 70 percent, but if the relative humidity of the atmosphere is low, conventional writing inks cannot be erased with a dry erasing material.

The primary object of the present invention is to provide an improved writing ink that can be applied to smooth and impermeable writing surfaces made of metal, plastic or ceramic material and easily erased by wiping with a dry erasing material even under low humidity conditions.

Another object of this invention is to provide a writing ink whose color remains clear without deterioration during storage in a marker pen.

SUMMARY OF THE INVENTION

The present invention is a writing ink consisting essentially of a solvent dye functioning as the coloring agent, a highly hygroscopic salt, and at least one solvent for the dye and the salt, the solvent including at least 70 percent by weight of at least one volatile alcohol. If desired a resin thickening agent may be added.

The nature, details, and utility of the invention will be more apparent from the following detailed description beginning with general considerations and concluding with examples of the preferred embodiment of the invention.

DETAILED DESCRIPTION

The writing ink of the present invention is designed to dry almost immediately after being applied to an impermeable writing surface of metal, plastic or ceramic material, yet retain sufficient water after drying so that the ink may be removed from the writing surface by wiping with a dry erasing material even under conditions of low humidity. The ink consists essentially of a solvent dye, a hygroscopic salt and a solvent for the dye and the salt, with the possible addition of a thickening agent.

The hygroscopic salt should be one whose saturated aqueous solution produces in the atmosphere a humidity of less than 40 percent RH at 20° centigrade. Examples of salts suitable for use in this invention are as follows: potassium acetate, potassium thiocyanide, sodium iodide, lithium bromide, lithium chloride and lithium iodide.

Solvent dyes suitable for use in the invention should be soluble in the solvent system chosen but substantially insoluble in water. It has been found that, if the dyes used are soluble in water, under high humidity conditions water droplets that gather on the surface of the writing board will dissolve the dyes and cause the written image to run.

Of course, the dye must not be substantive to the writing surface. However, since the writing surface will normally be metallic or some impermeable synthetic resin, as a practical matter this is not a limiting restriction and nearly all classes of dyes can be used insofar as they are soluble in the solvent systems chosen to the extent required to develop the desired color strength. Thus in appropriate circumstances, azo dyes (including monoazo, diazo, triazo and polyazo) such as Spirit Soluble Fast Red 3B (CI Solvent Red 75), diphenylmethane dyes such as Auramine Base (CI 41000B), triaryl methane dyes including di and triamino, aminohydroxy, hydroxy and diphenyl naphthyl methane species such as Victoria Blue B Base (CI 44045B), xanthene dyes including amino and hydroxy species such as Rhodamine B Base (CI 45170B), methine and polymethine dyes such as Zapon Fast Yellow G (CI 48045), indamine and indophenol dyes such as Fat Blue Z (CI 49705), azine dyes such as Nigrosine Base GB (CI 50415 B), anthraquinone dyes such as Brilliant Oil Blue BMA (CI Solvent Blue 16), phthalocyamine dyes such as Zapon Fast Blue HFL (CI 74350) and acid-base dye complexes such as Spirit Soluble Fast Red G (CI 13900, CI 45160) may be used.

The solvents used in the invention must dissolve the dye, the hygroscopic salt and the thickening agent if one is used. Moreover to insure the requisite combination of solubilizing power and rapid drying, the solvent should contain at least 70 percent by weight of at least one volatile alcohol, i.e., an alcohol having a vapor pressure at room temperature (20°C) between about 4 mmHg and about 70 mmHg. Examples of such alcohols include aliphatic monohydric alcohols having less than five carbon atoms, for instance ethyl, n-propyl, isopropyl, n-butyl, isobutyl, sec-butyl and tert-butyl alcohols. In addition the solvent may contain volatile ketone solvents (whose volatility will generally be within the limits defined above) such as methyl ethyl ketone and methyl isobutyl ketone, aromatic hydrocarbons (whose volatility is within the range indicated) such as xylene and toluene and ethers (whose volatility is within the range indicated) such as ethylene glycol monoethyl ether and ethylene glycol monomethyl ether. Water may also be present. Mixtures of several supplements may be used as may mixtures of volatile alcohols.

The thickening agent used may be any of a variety of inert normally solid materials soluble to the extent of say 10 percent by weight of the solvent used. Among thickeners which have been found useful there may be mentioned shellac, polyvinyl pyrrolidone, polyvinyl acetate, polyvinyl butyral and phenolic resins, such as phenol-formaldehyde resins.

The following examples are illustrative only and should not be construed as limiting the invention which is properly set forth in the appended claim.

EXAMPLE 1

6 grams of Zapon Fast Blue HFL (CI 74350) (solvent dye manufactured by Badische Anilin & Soda Fabrik A.G., Germany), 3 grams of lithium iodide and 15 grams of methyl ethyl ketone were added to 100 cc of butyl alcohol. The resulting mixture was agitated, whereupon the Zapon Fast Blue HFL, lithium iodide and methyl ethyl ketone dissolved completely in the butyl alcohol at room temperature, and a blue liquid ink was produced.

Handwriting with this ink on the above-mentioned writing surface could be erased easily after drying, by lightly wiping with a piece of dry cloth at a humidity above 10 percent RH.

EXAMPLE 2

5 grams of Oil Blue BO (CI 74350) (solvent soluble dye manufactured by Orient Kagaku Kogyo Co., Ltd., Japan), 5 grams of sodium iodide and 10 grams xylene were added to 100 cc of butyl alcohol. The resulting mixture was agitated, whereupon the Oil Blue BO, sodium iodide and xylene dissolved completely in the butyl alcohol at room temperature, and blue liquid ink was produced.

Handwriting with this ink on the above-mentioned writing surface could be erased easily after drying, by light wiping with a piece of dry cloth in an atmosphere at a humidity of 35 percent RH.

EXAMPLE 3

4 grams of Victoria Blue B Base (CI 44045B) (solvent soluble dye manufactured by Hodogaya Chemical Co., Ltd., Japan), 2 grams of shellac and 4 grams of sodium iodide were added to 100 cc of ethyl alcohol. The resulting mixture was agitated, whereupon the Victoria Blue B Base, shellac and sodium iodide dissolved completely in the ethyl alcohol at room temperature, and a blue liquid ink was produced.

Handwriting with this ink on the above-mentioned writing surface could be erased easily after drying, by light wiping with a piece of dry cloth at a humidity above 35 percent RH.

EXAMPLE 4

5 grams of Rhodamine Base B (CI 45170B) (solvent soluble dye manufactured by Sumitomo Kagaku Kogyo Co., Ltd., Japan), 1 gram of Luviskol (polyvinyl pyrrolidone manufactured by Badische Anilin & Soda Fabrik A.G., Germany), 4 grams of lithium iodide and 5 grams of water were added to 100 cc of isopropyl alcohol. The resulting mixture was agitated, whereupon the Rhodamine Base B, polyvinyl pyrrolidone, lithium iodide and water dissolved completely in the isopropyl alcohol at room temperature to produce a blue liquid ink.

Handwriting with this ink on the above-mentioned surface could be erased easily after drying, by light wiping with a piece of dry cloth at a humidity above 35 percent RH.

EXAMPLE 5

6 grams of Iosol Blue (CI Solvent Blue 30) (solvent soluble dry manufactured by National Aniline Div., Allied Chemical & Dye Corp., U.S.A.) 2 grams of polyvinyl acetate, 5 grams potassium thiocyanide and 10 grams of methyl isobutyl ketone were added to 100 cc of ethyl alcohol. The resulting mixture was agitated, whereupon the Iosol Blue, polyvinyl acetate, potassium thiocyanide and methyl isobutyl ketone dissolved completely in the ethyl alcohol at room temperature to produce a blue liquid ink.

Handwriting with this ink on the above-mentioned writing surface could be erased easily after drying, by light wiping with a piece of dry cloth at a humidity above 35 percent RH.

EXAMPLE 6

6 grams of Nigrosine Base GB (CI 50415B) (solvent soluble dye manufactured by Farbenfabriken Bayer A.G., Germany), 3 grams of Tamanole 100 S (100 percent phenolformaldehyde resin manufactured by Arakawa Forest Chemical Industries, Ltd., Japan), 4 grams of lithium iodide and 15 grams of methyl cellosolve (ethylene glycol monomethyl ether) were added to 100 cc of isopropyl alcohol. The resulting mixture was agitated, whereupon the Nigrosine Base GB, Tamanol, lithium iodide and methyl cellosolve dissolved completely in the isopropyl alcohol at room temperature to produce a black liquid ink.

Handwriting with this ink on the above-mentioned surface could be erased easily after drying, by light wiping with a pice of dry cloth at a humidity above 10 percent RH.

EXAMPLES 7-14

Following the procedure of example 1 inks were compounded using the ingredients and proportions set forth in the following Table A. The proportions given are parts by weight.

TABLE A

|  | 7 | 8 | 9 | 10 | 11 | 12 | 13 | 14 |
|---|---|---|---|---|---|---|---|---|
| SPILON PINK BH (CI Solvent Red 82) | 1.5 | 0.7 | 0.8 |  | 2.0 | 1.2 |  |  |
| IRGACET BRILLIANT BLUE 2 GLN (CI Solvent Blue 48) |  | 5.0 | 2.6 | 3.8 | 2.0 | 1.2 |  |  |
| SPILON ORANGE GRH (CI Solvent Orange 37) | 3.5 |  | 1.4 |  |  | 3.6 |  |  |
| DAIWA SOLVENT BLACK A (Cyclohexylamine Salt of CI 15711) |  |  | 4.0 |  |  |  |  |  |
| SPILON YELLOW GRH (CI Solvent Yellow 61) |  |  |  | 1.2 |  |  | 4.5 | 5.0 |
| IRGACET RED 2BL (CI Solvent Red 132) |  |  |  |  |  |  | 1.5 |  |
| LITHIUM BROMIDE | 5.0 | 5.0 | 4.4 | 5.0 | 5.0 | 5.0 | 5.0 | 5.0 |
| POLYVINYL BUTYRAL | 2.0 | 2.0 | 1.4 | 2.0 | 2.0 | 2.0 | 2.0 | 2.0 |
| LUBRICATING OIL | 4.0 | 2.0 | 3.0 | 2.0 | 2.0 | 4.0 | 4.0 | 4.0 |
| N-PROPYL ALCOHOL | 93.0 | 93.0 | 50.0 | 93.0 | 98.0 | 93.0 | 98.0 | 98.0 |
| ETHYLENE GLYCOL MONOMETHYL ETHER | 5.0 | 5.0 | 10.0 | 5.0 |  | 5.0 |  |  |
| ETHYL ALCOHOL (INDUSTRIAL) |  |  | 24.0 |  |  |  |  |  |
| COLOR | RED | BLUE | BLACK | GREEN | VIOLET | SEPIA | ORANGE | YELLOW |

Other sample components, in parts by weight, are as follows. The writing inks described in these examples are prepared at room temperature by first mixing the various solvents together and then dissolving in the mixture, in sequence, the hygroscopic salt, any thickening agent and the solvent dyes. The resulting solution, after standing 24 hours, is filtered through cotton cloth to produce the writing ink.

EXAMPLE 15

| Spirit Soluble Fast Red G (CI 13900, 45160) | 5.0 |
|---|---|
| lithium bromide | 5.0 |
| n-propyl alcohol | 90.0 |
| ethylene glycol monomethyl ether | 5.0 |
| polyvinyl acetate | 1.0 |
| color | RED |

EXAMPLE 16

| Spirit Soluble Fast Red 3B (CI Solvent Red 75) | 4.0 |
|---|---|
| Aizen Spilon Yellow GRH (CI Solvent Yellow 61) | 1.5 |
| potassium acetate | 4.0 |
| iso-propyl alcohol | 80.0 |
| water | 5.0 |
| ethylene glycol monomethyl ether | 5.0 |
| color | RED |

EXAMPLE 17

| Zapon Fast Blue HFL (CI 74350) | 1.0 |
|---|---|
| Iosol Blue (CI Solvent Blue 30) | 5.0 |
| sodium iodide | 4.0 |
| iso-propyl alcohol | 70.0 |
| xylene | 10.0 |
| ethylene glycol monomethyl ether | 10.0 |
| 100% phenol-formaldehyde resin | 1.0 |
| color | BLUE |

EXAMPLE 18

| Victoria Blue B Base (CI 44045B) | 4.0 |
|---|---|
| potassium thiocyanide | 4.0 |
| ethyl alcohol (Industrial) | 20.0 |
| sec-butyl alcohol | 70.0 |
| shellac | 2.0 |
| color | BLUE |

EXAMPLE 19

| Spirit Soluble Fast Red 3B (CI Solvent Red 75) | 0.8 |
|---|---|
| Aizen Spilon Yellow GRH (Solvent Yellow 61) | 1.2 |
| Zapon Fast Blue HFL (CI 74350) | 1.4 |
| Nigrosine Base GB (CI 50415B) | 4.0 |
| lithium iodide | 5.0 |
| ethyl alcohol (Industrial) | 40.0 |
| n-propyl alcohol | 40.0 |
| ethylene glycol monomethyl ether | 20.0 |
| polyvinyl butyral | 2.0 |
| color | BLACK |

EXAMPLE 20

| Aizen Spilon Yellow GRH (CI Solvent Yellow 61) | 1.2 |
|---|---|
| Zapon Fast Blue HFL (CI 74350) | 4.0 |
| lithium bromide | 5.0 |
| n-propyl alcohol | 80.0 |
| methyl iso-butyl ketone | 10.0 |
| polyvinyl butyral | 2.0 |
| color | GREEN |

EXAMPLE 21

| Spirit Soluble Fast Red G (CI 13900, 45160) | 1.6 |
|---|---|
| Aizen Spilon Yellow GRH (CI Solvent Yellow 61) | 4.2 |
| lithium chloride | 4.0 |
| ethyl alcohol (Industrial) | 40.0 |
| n-propyl alcohol | 40.0 |
| ethylene glycol monomethyl ether | 10.0 |
| color | ORANGE |

EXAMPLE 22

| Aizen Spilon Yellow GRH (CI Solvent Yellow 61) | 4.5 |
|---|---|
| potassium acetate | 4.0 |
| iso-propyl alcohol | 80.0 |
| water | 5.0 |
| ethylene glycol monomethyl ether | 5.0 |
| polyvinyl pyrrolidone | 1.0 |
| color | YELLOW |

EXAMPLE 23

| Spirit Soluble Fast Red 3B (CI Solvent Red 75) | 2.5 |
|---|---|
| Iosol Blue (CI Solvent Blue 30) | 1.6 |
| lithium chloride | 4.0 |
| ethyl alcohol (Industrial) | 40.0 |
| n-propyl alcohol | 45.0 |
| ethylene glycol monomethyl ether | 5.0 |
| polyvinyl pyrrolidone | 1.0 |
| color | VIOLET |

EXAMPLE 24

Spirit Soluble Fast Red 3B

-continued

| | |
|---|---|
| (CI Solvent Red 75) | 2.5 |
| Aizen Spilon Yellow GRH | |
| (CI Solvent Yellow 61) | 2.2 |
| Zapon Fast Blue HFL | |
| (CI 74350) | 1.0 |
| sodium iodide | 4.0 |
| ethyl alcohol | |
| (Industrial) | 60.0 |
| n-propyl alcohol | 20.0 |
| ethylene glycol mono-methyl ether | 10.0 |
| polyvinyl acetate | 1.5 |
| color | BROWN |

The polyvinyl acetate in Examples 15 and 24 has an average degree of polymerization of about 450 The phenol-formaldehyde resin in Example 17 has a softening point at about 110°–130° Centigrade and an acid value of about 85–100 The polyvinyl butyral in Examples 19 and 20 has an average degree of polymerization of about 300 and is composed of vinyl butyral in an amount of 60 plus or minus 3 mol percent and vinyl acetate in an amount of less than 3 mol percent. The polyvinyl pyrrolidone in Examples 22 and 23 has a K-value of about 26–35. The shellac in Example 18 contains less than about 5.5 percent wax and has a softening point at about 70° Centigrade.

The inks of the present invention, when erased, produce less than 10 percent of the amount of fine powder produced by chalk, and therefore the present inks, in addition to their other advantages, are far less detrimental to the health and comfort of the user.

We claim:

1. An ink for application to a substantially impermeable writing surface consisting essentially of
   at least one solvent dye substantially insoluble in water and not substantive to the writing surface,
   at least one hygroscopic salt selected from the group consisting of salts each of whose saturated aqueous solution produces in the surrounding atmosphere a relative humidity of less than 40 percent at a temperature of 20° centigrade, and
   at least one solvent for the dye and the salt, said solvent containing at least 70 percent by weight of at least one volatile alcohol having a vapor pressure at 20° centigrade between about 4 mmHg and about 70 mmHg,
   there being between about 4 and about 10 parts of the dye and between about 3 and about 8 parts of the salt per 100 parts by weight of the solvent.

2. The ink claimed in claim 1, wherein said solvent also contains a supplemental component selected from the group consisting of ketones, aromatic hydrocarbons, ethers, water and mixtures thereof.

3. The ink claimed in claim 1 wherein the hygroscopic salt is selected from the group consisting of potassium acetate, potassium thiocyanide, sodium iodide, lithium bromide, lithium chloride and lithium iodide.

4. The ink claimed in claim 1 wherein the volatile alcohol is selected from the group consisting of ethyl alcohol, n-propyl alcohol, iso-propyl alcohol, n-butyl alcohol, iso-butyl alcohol, sec-butyl alcohol and t-butyl alcohol.

5. The ink claimed in claim 4 wherein the hygroscopic salt is selected from the group consisting of potassium acetate, potassium thiocyanide, sodium iodide, lithium bromide, lithium chloride and lithium iodide.

6. An ink for application to a substantially impermeable writing surface consisting essentially of
   at least one solvent dye substantially insoluble in water and not substantive to the writing surface,
   at least one hygroscopic salt selected from the group consisting of salts each of whose saturated aqueous solution produces in the surrounding atmosphere a relative humidity of less than 40 percent at a temperature of 20° centigrade,
   at least one thickening agent selected from the group consisting of shellac, phenolic resins, polyvinyl acetate, polyvinyl butyral and polyvinyl pyrrolidone,
   at least one solvent for the dye, the salt and the thickening agent, said solvent containing at least 70 percent by weight of at least one volatile alcohol having a vapor pressure at 20° centigrade between about 4 mmHg and about 70 mmHg,
   there being between about 4 and about 10 parts of the dye, between about 1 and about 3 parts of the thickening agent and between about 3 and about 8 parts of the salt per 100 parts by weight of the solvent.

7. The ink claimed in claim 6, wherein said solvent also contains a supplemental component selected from the group consisting of ketones, aromatic hydrocarbons, ether, water and mixtures thereof.

8. The ink claimed in claim 6 wherein the hygroscopic salt is selected from the group consisting of potassium acetate, potassium thiocyanide, sodium iodide, lithium bromide, lithium chloride and lithium iodide.

9. The ink claimed in claim 6 wherein the volatile alcohol is selected from the group consisting of ethyl alcohol, n-propyl alcohol, iso-propyl alcohol, n-butyl alcohol, iso-butyl alcohol, sec-butyl alcohol and t-butyl alcohol.

10. The ink claimed in claim 9 wherein the hygroscopic salt is selected from the group consisting of potassium acetate, potassium thiocyanide, sodium iodide, lithium bromide, lithium chloride and lithium iodide.

* * * * *